(12) United States Patent
Haack et al.

(10) Patent No.: US 8,899,523 B2
(45) Date of Patent: Dec. 2, 2014

(54) FIRE PROTECTION SPACE FOR AIRCRAFT PASSENGERS PROVIDED WITH THE AID OF FUSELAGE SKIN OF FIBRE-METAL LAMINATES

(75) Inventors: Cord Haack, Beckdorf (DE); Thomas Beumler, Jork (DE)

(73) Assignee: AIRBUS Operations GmbH, Hamburg (DE)

( * ) Notice: Subject to any disclaimer, the term of this patent is extended or adjusted under 35 U.S.C. 154(b) by 701 days.

(21) Appl. No.: 12/595,227

(22) PCT Filed: Apr. 14, 2008

(86) PCT No.: PCT/EP2008/054500
§ 371 (c)(1),
(2), (4) Date: Apr. 19, 2010

(87) PCT Pub. No.: WO2008/128920
PCT Pub. Date: Oct. 30, 2008

(65) Prior Publication Data
US 2010/0206987 A1    Aug. 19, 2010

Related U.S. Application Data

(60) Provisional application No. 60/913,122, filed on Apr. 20, 2007.

(30) Foreign Application Priority Data

Apr. 20, 2007  (DE) .......................... 10 2007 018 753

(51) Int. Cl.
*B64C 1/10* (2006.01)
*B64C 1/12* (2006.01)
*B64C 1/40* (2006.01)
*A62C 3/08* (2006.01)

(52) U.S. Cl.
CPC ... *A62C 3/08* (2013.01); *B64C 1/12* (2013.01); *B64C 1/40* (2013.01); *Y02T 50/46* (2013.01)
USPC ........................................................ 244/121

(58) Field of Classification Search
USPC ............ 244/119, 120, 121, 132, 129.2, 158.9
See application file for complete search history.

(56) References Cited

U.S. PATENT DOCUMENTS 6,114,050 A    9/2000  Westre et al.
6,322,022 B1 *  11/2001  Fay et al. ...................... 244/121

(Continued)

FOREIGN PATENT DOCUMENTS

CN    1906083 A    1/2007
DE    199 56 394 A1   6/2001

(Continued)

OTHER PUBLICATIONS

German Examination Report, German Application No. 10 2007 018 753.1-22, Nov. 2, 2010, 8 pages.

(Continued)

*Primary Examiner* — Philip J Bonzell
(74) *Attorney, Agent, or Firm* — Fenwick & West LLP

(57) ABSTRACT

This invention provides a fuselage of an aircraft or space vehicle with a fuselage section having an outer skin, wherein at least the outer skin of the fuselage section consists of a glass-fiber reinforced aluminum laminate to form a safety zone for passengers in the event of a fire.

11 Claims, 4 Drawing Sheets

(56) References Cited

U.S. PATENT DOCUMENTS

| | | | |
|---|---|---|---|
| 6,358,591 B1 * | 3/2002 | Smith | 428/74 |
| 6,435,455 B1 | 8/2002 | Holman et al. | |
| 6,460,240 B1 | 10/2002 | Kielies et al. | |
| 6,565,040 B2 * | 5/2003 | Fay et al. | 244/121 |
| 6,648,273 B2 * | 11/2003 | Anast | 244/119 |
| 6,736,919 B1 * | 5/2004 | Roebroeks | 156/201 |
| 6,861,156 B2 * | 3/2005 | Palm | 428/594 |
| 7,021,856 B2 * | 4/2006 | Assler et al. | 403/408.1 |
| 7,087,317 B2 * | 8/2006 | Ehrstrom et al. | 428/650 |
| 7,325,771 B2 * | 2/2008 | Stulc et al. | 244/119 |
| 7,837,147 B2 * | 11/2010 | Liguore et al. | 244/119 |
| 2002/0017590 A1 * | 2/2002 | Fay et al. | 244/3.1 |
| 2003/0080251 A1 * | 5/2003 | Anast | 244/119 |
| 2003/0168555 A1 * | 9/2003 | Livi et al. | 244/132 |
| 2005/0037188 A1 * | 2/2005 | Ehrstrom et al. | 428/299.4 |
| 2006/0060705 A1 * | 3/2006 | Stulc et al. | 244/119 |
| 2006/0208135 A1 * | 9/2006 | Liguore et al. | 244/117 R |
| 2006/0284014 A1 * | 12/2006 | Muller et al. | 244/119 |
| 2007/0023572 A1 | 2/2007 | Muller et al. | |
| 2007/0164159 A1 * | 7/2007 | Koch et al. | 244/121 |

FOREIGN PATENT DOCUMENTS

| | | |
|---|---|---|
| DE | 101 56 125 A1 | 5/2003 |
| DE | 10 2004 001 078 A1 | 7/2005 |
| DE | 10 2004 001 078 A1 | 7/2005 |
| DE | 10 2004 001 049 B4 | 10/2009 |
| JP | 05-087108 | 4/1993 |
| JP | 09-193296 | 7/1997 |
| JP | 2005-514484 | 5/2008 |
| RU | 2116156 C1 | 7/1998 |
| WO | WO 00/75012 A1 | 12/2000 |
| WO | WO 2007/036673 A1 | 4/2007 |

OTHER PUBLICATIONS

Chinese Office Action, Chinese Application No. 200880012111.7, May 4, 2011, 3 pages.

German Office Action, German Application No. 10 2007 018 753.1, Sep. 9, 2011, 14 pages.

Russian Office Action, Russian Application No. 2009139199/12, May 18, 2012, 5 pages.

PCT International Search Report and Written Opinion, PCT Application No. PCT/EP2008/054500, Aug. 6, 2008, 9 pages.

Japanese Office Action, Japanese Application No. 2010-503475, Oct. 2, 2012, 6 pages.

European Examination Report, European Application No. 08736199.4, Aug. 28, 2014, 4 pages.

* cited by examiner

FIRE PROTECTION SPACE FOR AIRCRAFT PASSENGERS PROVIDED WITH THE AID OF FUSELAGE SKIN OF FIBRE-METAL LAMINATES

FIELD OF THE INVENTION

This invention relates to a fuselage in an aircraft or space vehicle. The present invention relates, in particular, to a fire protection device in a fuselage of a commercial and/or transport aircraft.

As part of the improvement in the protection against burn-out of aircraft, Paragraph FAR §25.856 (b) applicable to this will initially be extended to all new commercial aircraft. The requirement consists in guaranteeing a burn-out safety time of 4 minutes so that in the event of a fire outside the cabin there is sufficient time remaining to evacuate the passengers. This is generally attempted by ensuring special preparation of the insulation that is in any case present inside the supporting structure.

Commercial aircraft fuselages generally consist of supporting structures that are transversely and longitudinally which support the outer skin and are stiffened by means of stringers and ribs. These units, also called shells, are joined together to form sections and tubular sections, and eventually constitute the pressure fuselage in further assembly.

Here the aircraft cabin is provided with thermal and acoustic insulation which is arranged between the aircraft cabin and the outer skin of the aircraft. In order to protect the aircraft cabin in the event of a fire, such insulation is produced from a burn-out-resistant material.

In this case, however, the openings must be suitably adapted for cabin ventilation. The openings for cabin ventilation must in this case be designed so that they can be sealed with valves in the event of a fire and so that a fire is prevented from spreading in the manner of a chimney effect. On the other hand, the valves must be normally open so that ventilation of the cabin is possible. The opening and closing of the valves must in this case be suitably controlled and maintained. However, such a complicated valve system results on the one hand in additional weight, and on the other in considerable production and maintenance costs. Another problem is that the insulation does not form a supporting structure, which means that if the outer skin melts in a fire, the insulation cannot perform a supporting function and the cabin space therefore implodes.

The state of the art as disclosed in DE 199 56 394 describes a hybrid material in which prepreg layers consisting of glass fibres and epoxy resin are arranged between metal layers. The different layers are then glued together in the autoclave process and may, for example, be used as skin panels for a pressure fuselage.

Although it can be applied to any type of fuselage, this invention and the problem on which it is based are explained in greater detail in relation to a fuselage of a commercial aircraft.

Fuselages of modern commercial aircraft have, in principle, a fuselage arrangement consisting of an outside skin and structural components. The structural components, i.e. stringers or ribs, for example, are in this case connected to the skin, mainly to achieve high stability of the fuselage. The skin has in this case been hitherto produced essentially from aluminium or an aluminium alloy. However, this melts relatively quickly in a fire (in approximately 30 seconds), and does not therefore provide adequate burn-out protection by itself.

SUMMARY OF THE INVENTION

The object of this invention is therefore to provide a fuselage which guarantees adequate burn-out protection for over >4 minutes in the event of a fire.

According to the invention this object is achieved by a fuselage with the features of claim 1.

Accordingly, a fuselage of an aircraft or space vehicle is provided in which at least the outer skin of a fuselage section consists of glass-fibre reinforced aluminium laminate (GLARE®, for example), in order to form a safety zone for passengers in the event of a fire, wherein a minimum number of connecting elements are provided from titanium materials or another heat resistant material or material combination.

The idea forming the basis of this invention consists in providing, for a fuselage, at least one fuselage section or fuselage length consisting of the glass fibre reinforced aluminium laminate in order to form a safety zone or fire protection zone in the fuselage into which passengers can escape in the event of a fire. It is recommended by the inventors that the safety zone be designed in such a size that it is able to accommodate all the passengers present in the aircraft, but at least those in business class.

Such a fuselage section has the advantage over insulations consisting of a fire retarding or burn-out resistant material in that it remains dimensionally stable for a longer time in the event of a fire. Consequently passengers are able to escape into this region of the fuselage and time can be gained for evaluation of these passengers.

The invention therefore enables at least one fuselage section to be provided which provides burn-out protection for a longer time in the event of an external fire, for example, and in doing so remains dimensionally stable, with the result that that part of the fuselage remains intact for a certain time without imploding.

Further embodiments of the invention are described in the dependent claims.

In an inventive embodiment the fuselage section forming a safety zone is provided in the front cabin region of the fuselage, for example in the cabin region behind the cockpit. Alternatively or additionally, the fuselage section forming a safety zone is arranged in the rear cabin region of the fuselage, for example in the cabin region in front of the rear pressure bulkhead. Consequently, if a fire breaks out in the region of the wings, passengers are able to escape into the front or rear region of the fuselage, i.e. into the fuselage section forming a safety zone.

In a further alternative embodiment of the invention the fuselage section forming a safety zone may also be additionally arranged in the central cabin region of the fuselage, for example in the region of the wing, or may extend throughout the cabin region of the fuselage. In principle more than one or two fuselage sections may be produced from the material GLARE® may also be provided, according to the size of the aircraft, for example. Here one or more fuselage sections according to the invention may be provided in the regions where there are exits or emergency exits.

In another embodiment of the invention some or all of the connecting elements for connecting parts which form the fuselage section forming the safety zone, for example the skin or the skin panels, stringers, rubs and/or clips, etc., are produced from a material which resists heat for at least a certain time in the event of a fire, for example titanium and/or a titanium alloy or another suitable material or material combination.

In another embodiment of the invention connecting elements can be used, for example, such as rivets, screws or bolts, this list only being given by way of example and is not conclusive.

According to a further embodiment of the invention the material combination GLARE® in this case comprises so-called standard GLARE (Glass Fibre Reinforced Aluminium) and/or a so-called HSS-GLARE (High Static Strength-Glass-Fibre Reinforced Aluminium). In principle, however, other types of suitable fibre-metal laminates (FML) are also conceivable which are comparable in their characteristics to the GLARE or HSS-GLARE in the prior art, at least in terms of burn-out resistance and dimensional stability over a certain length of time in the event of a fire.

In a further embodiment of the invention the fuselage can also be provided with thermal and/or acoustic insulation. The insulation may in this case be fire retardant, for example, or burn-out resistant, but it need not necessary be so since the fuselage section produced from the material combination GLARE® or a comparable material already provides burn-out protection.

The inventive fuselage may, for example, be used in commercial or passenger and transport aircraft. In principle, however, it may also be used in space vehicles.

The invention is explained in further detail in the following by means of exemplary embodiments with reference to the enclosed figures in the drawing.

DETAILED DESCRIPTION OF THE DRAWINGS

In the figures the same reference numbers denote the same or functionally similar components, unless otherwise indicated.

Figure 1A:
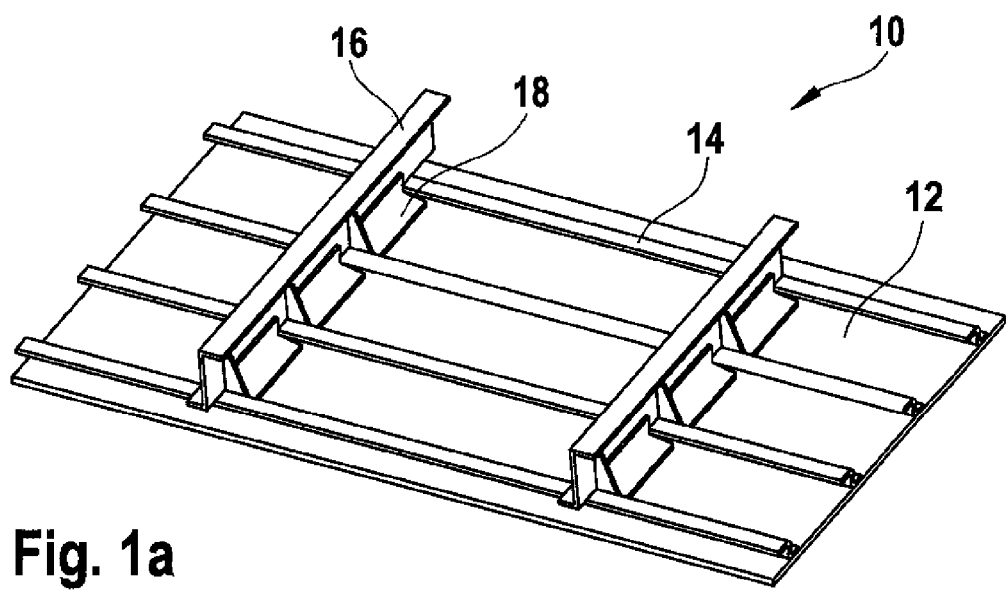
FIGS. 1a,b show perspective views of a stiffened skin according to the state of the art.
Figure 1B:
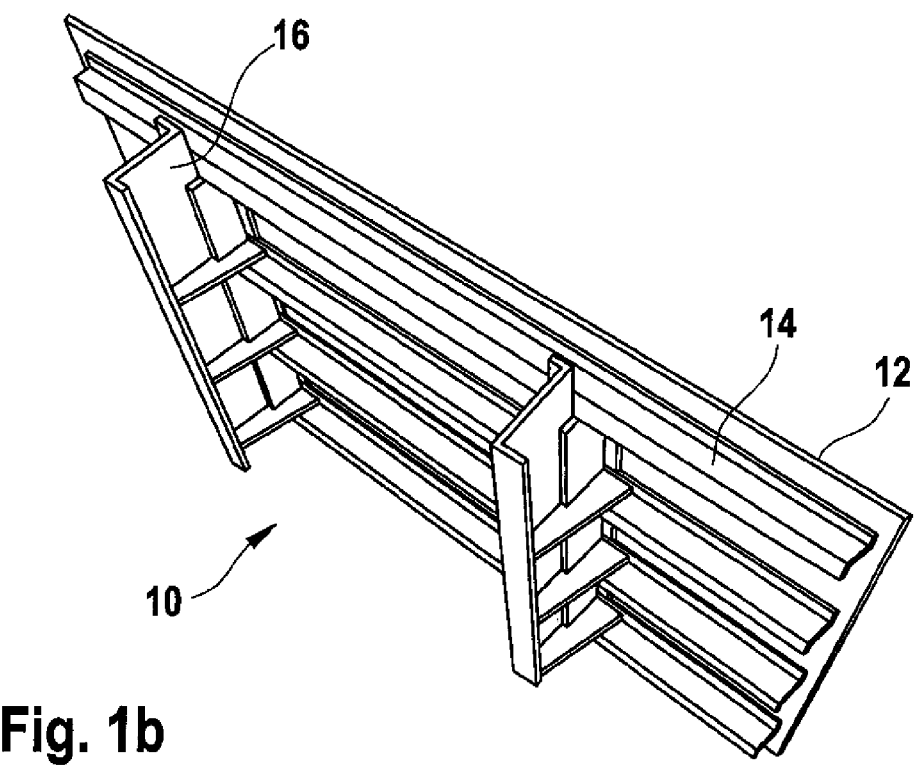

FIGS. 1a and 1b each show a perspective view of a skin element 10, for example an outer skin element of an aircraft. In aircraft pressure fuselages are generally produced integrally from a plurality of shells of such skin elements 10. In this case skin element 10 consists, for example, of a skin 12 or skin panel and stringers 14 for longitudinal stiffening. Furthermore, ribs 16 are provided in the transverse direction, which are fastened to the skin panel 12 by means of clips 18 or thrust vanes.

Figure 2:
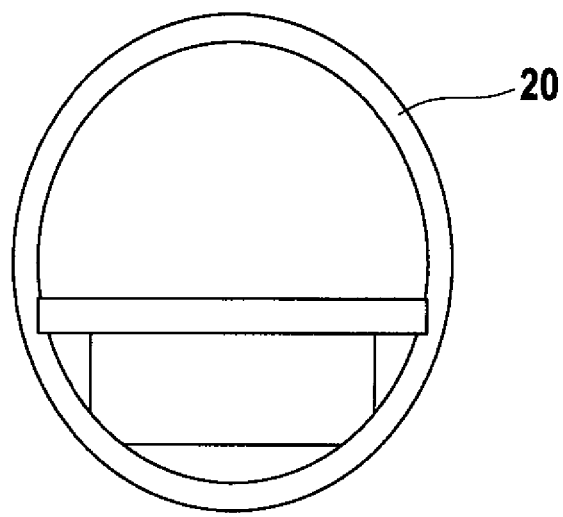
FIG. 2 shows a diagrammatic representation of a fuselage shell which is produced from skin elements according to FIGS. 1a and 1b.

Fuselage section shells 20, consisting of a plurality of skin elements, are in this case prefabricated with the ribs in partial shells and are joined together to form one section in the final assembly in large devices. Such a section 20 is shown diagrammatically in a front view in FIG. 2.

Thermal insulation 22 is installed inside above all parts consisting of skin or skin panel 12, stringers 14 and ribs 16, thereby protecting the passengers from ambient temperatures of the outside air in the range down to −70° C., at considerable heights, and up to +50° C. on the ground, if the aircraft is exposed to the sun.

This insulation 22 is, as described above, produced so that it is burn-out resistant in order to comply with FAR §25.856 (b). According to FAR §25.856 (b) the burn-out time of 1.5 minutes to be demonstrated is increased to 4 minutes so that in the event of a fire outside the cabin, more time remains to evacuate the passengers. For this reason the insulation currently used would have to be used in combination with an aluminium fuselage skin in a larger volume, which would lead to an increase in weight.

The provision of a burn-out resistant insulation results in an increase in aircraft weight and the openings required, for example for cabin ventilation, would have to be specially prepared with closing mechanisms, just as the valve mechanism described above. However, this design results in an additional weight increase and, moreover, does not form a dimensionally stable supporting structure since insulation layer 22 is arranged on the inside of outer skin 12.

Figure 3:
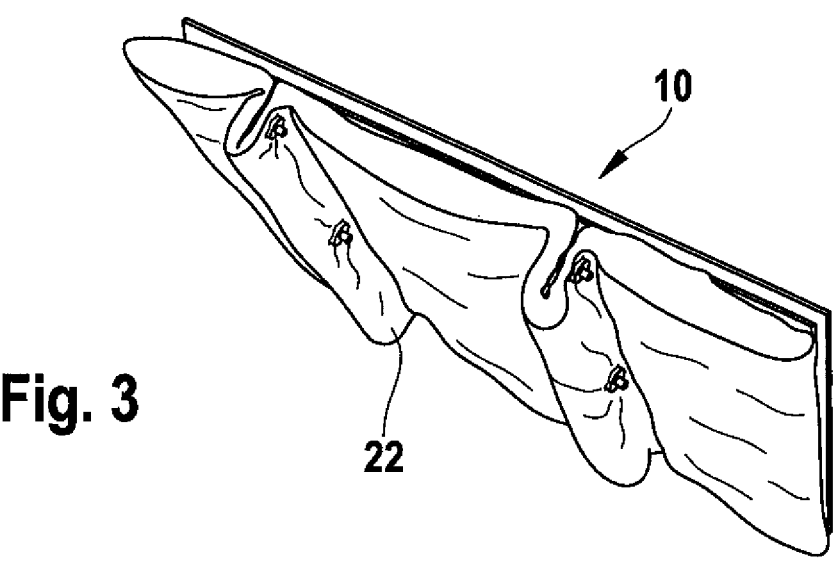
FIG. 3 shows a perspective view of a stiffened skin which is provided with an insulation according to the state of the art.
Figure 4:
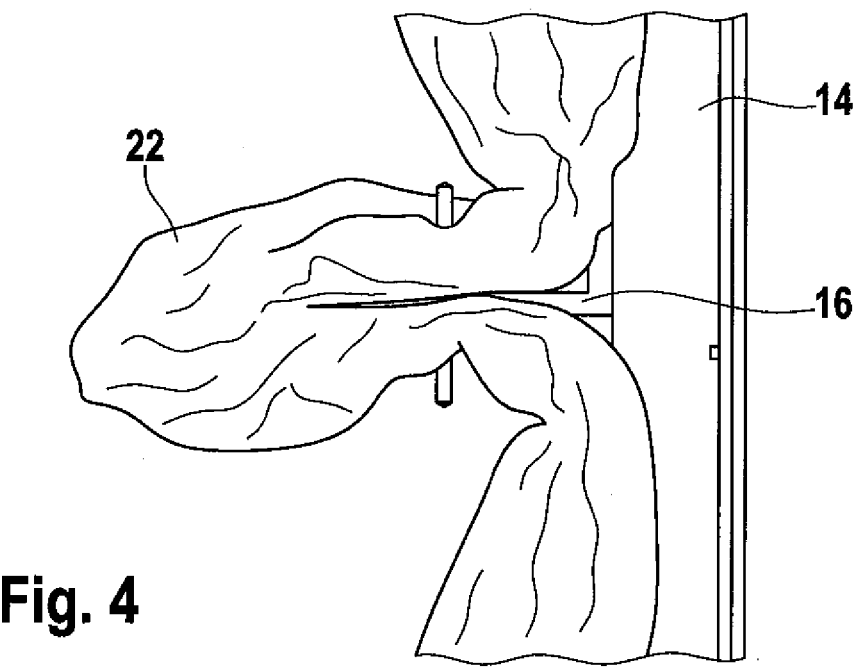
FIG. 4 shows a section of the stiffened skin according to FIG. 3.

FIGS. 3 and 4 show the stiffened skin element 10 according to FIGS. 1a and 1b, wherein skin element 109 is additionally provided with insulation 22. FIG. 4 shows a section of skin element 10, in which the insulation 22 is fastened to a rib 16.

On the other hand, tests show that a fuselage section whose outer skin is produced from glass-fibre reinforced aluminium GLARE® remains dimensionally stable for a longer time in the event of an external fire.

In these tests it was demonstrated, in particular, that the conditions of FAR §25.856 are met, a burn-out time of 15 minutes and longer being achieved.

According to an exemplary embodiment of the invention laminate 26, of glass-fibre reinforced aluminium GLARE®, is used in the production of a fuselage section 24. In this case the outer skin of fuselage section 24 is produced completely of GLARE. Such a fuselage section 24 therefore provides a safety zone for the passengers in the event of a fire outside the passenger cell. In principle, fuselage section 24 may here be provided in a front region 28 of an aircraft 30, for example behind the cockpit or in a rear region 32 of aircraft 30. In this case exits or emergency exits 34, for example, may be provided in these regions. If fire breaks out in the region of the wings or power units, the passengers are able to escape into the inventive fuselage section 24 in the front or rear region 28, 32.

Because fuselage section 24 exhibits a relatively long burn-out time, according to the invention, and remains dimensionally stable for a correspondingly long period, more time remains for the passengers to be evacuated there in such an emergency.

The disadvantages explained above with reference to the state of the art are therefore eliminated by the new design and inventive fuselage. In this case the most recently developed weight-saving glass-fibre reinforced aluminium laminate GLARE© is used for the skin panels or skin layers, i.e. as an integral unit for the protective cell at the point where defense against fire is necessarily to be provided so that the supporting structure is also maintained dimensionally stable for a longer period. This means that the material GLARE® is not simply provided partially on the aircraft, as was previously the case, in order to serve as a protection against puncturing in some regions, but at least the outer skin of a complete fuselage section is also specifically formed from this material to provide a safety zone in the event of a fire.

In this case it is also conceivable for structural components, e.g. stringers, ribs, clips and/or thrust vanes, to be optionally and additionally formed from the material GLARE® in the region of fuselage section 26. The list is merely given here by way of example and is not conclusive. In principle, however, the outer skin of GLARE® forms a suitable burn-out protection and provides dimensional stability in the event of a fire. However, this can be further assisted, as previously mentioned, if at least individual structural components are also produced from GLARE.

Since the glass-fibre reinforced aluminium laminate GLARE© guarantees burn-out safety over a certain period, and also has a lower density than aluminium skins, and is therefore lighter, insulation 22 need not be modified and the required cabin ventilation can be maintained. In other words, the conventional insulation 22 can be maintained and need not necessarily be replaced by a flame retardant or burn-out resistant insulation, for example. Furthermore, a completed valve mechanism may also be dispensed with which, as described above, seals openings for cabin ventilation in the event of a fire in order to prevent the spread of a fire by means of a chimney effect.

In principle, however, a flame-retardant and/or burn-out resistant insulation 22 may also be used.

Figure 5:
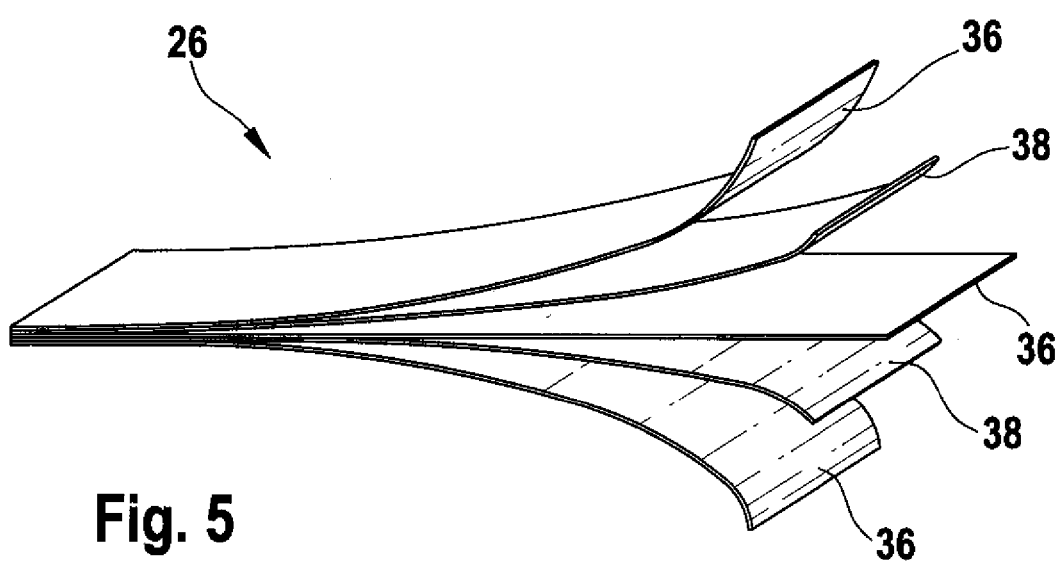
FIG. 5 shows a diagrammatic view of the structure of the fibre-metal laminate according to the invention.

FIG. 5 shows diagrammatically the basic structure of a glass-fibre reinforced aluminium laminate GLARE©, as can be used in the invention, for example. Here laminate 26 consists, for example, of three layers of aluminium sheets 36, a glass fibre mat 38 being arranged between the aluminium layers 36. The material layers are in this case glued in the autoclave. The number of layers of aluminium sheets 36 and glass fibre mats 38 may be varied arbitrarily according to the function and purpose of use. The representation in FIG. 5 is purely exemplary and the invention is not limited to it.

The licensing of the glass-fibre reinforced aluminium laminate GLARE© has been documented with reference to Airbus Document EMF-723/99, and was ratified in Issue 5 by the European and American aviation authorities, and by Airbus. The burn-out resistance and development of toxic gases from GLARE® in the event of a fire, according to standardised tests, is shown in Chapter C3 of Report DMF-723/99. Both criteria are met according to applicable regulations of the aviation industry, the burn-out time being more than 15 minutes.

In a fire the outer aluminium layer initially burns where the glass-fibre reinforced aluminium laminate is used, and the first glass fibre layer then forms a barrier against burn-out. At the same time the temperature is maintained at a tolerable 200° C. on the opposite side of the flame.

The glass-fibre reinforced aluminium laminate GLARE© is processed exactly as conventional aluminium sheets. The separating points on the sheet ends must be connected with titanium bolts, for example, so that here too the structural integrity is preserved. Aluminium bolts would melt, for example, unlike titanium bolts.

Commercial aircraft fuselages generally consist of transversely and longitudinally stiffened supporting structures, for example of a combination of stringers and ribs, which support the outer skin. These units, also called shells, are joined together to form sections 20, tubular sections, for example, and form the pressure fuselage in further assembly.

When using glass-fibre reinforced aluminium laminates GLARE© for the outer skin, aircraft sections or fuselage sections 24 can be produced which remain dimensionally stable against burn-out for a longer time and therefore provide a refuge area for the endangered passengers until they can be fully evacuated.

Figure 6:
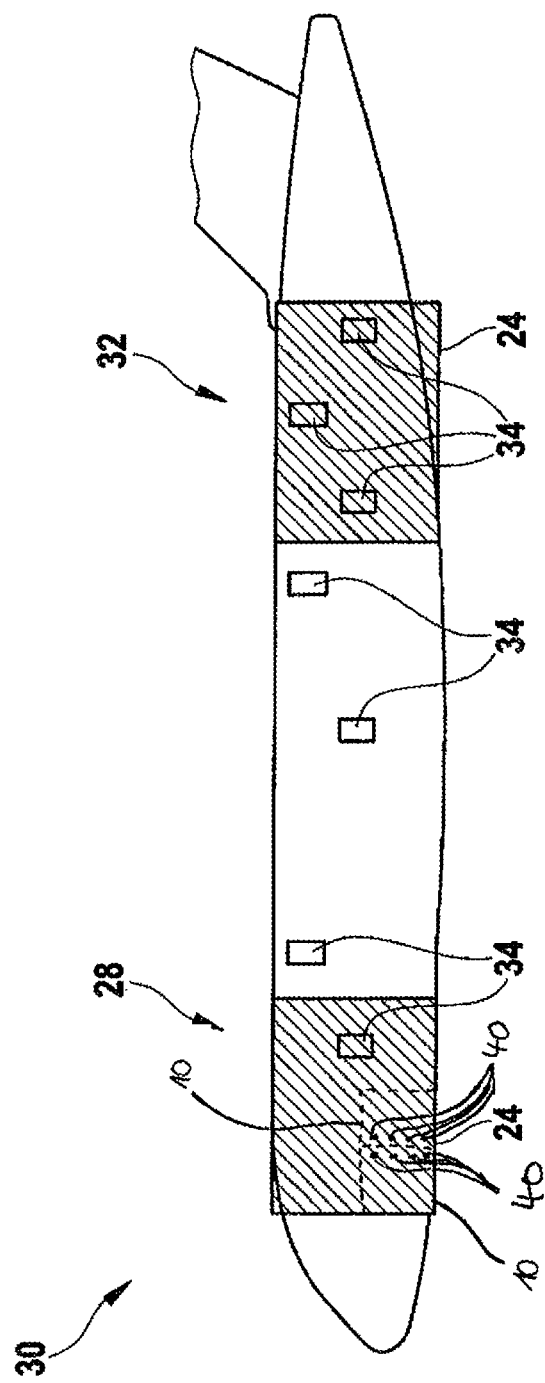
FIG. 6 shows a diagrammatic side view of an aircraft fuselage according to the invention.

Such protective cells 24 can, as shown in FIG. 6, be arranged, for example, in the front and/or rear region 28, 34 of the fuselage in order to provide regions to escape to in the event of a wing fire. For example, all the doors 34 and gates in these regions are produced with the same skin of glass-fibre reinforced aluminium laminate GLARE©. A minimum number of connecting elements, for example rivets, bolts, screws and/or clips etc., are provided from titanium materials, for example, or another heat resistant material or material combination.

Although this invention has been described here with reference to preferred exemplary embodiments, it is not limited to them but can be modified in many different ways.

LIST OF REFERENCE NUMERALS

10 Skin element
12 Skin
14 Stringer
16 Rib
18 Clip
20 Fuselage section shell
22 Insulation
24 Fuselage section
26 GLARE laminate
28 Front region (aircraft)
30 Aircraft
32 Rear region (aircraft)
34 Exit of emergency exit
36 Aluminium sheet
38 Glass fibre mat

The invention claimed is:

1. An aircraft or space vehicle comprising a fuselage, wherein the fuselage comprises:
   a fuselage section forming a safety zone for passengers in the event of a fire, having:
      an outer skin that includes skin panels having sheet ends, wherein the skin panels consist completely of high static strength glass-fibre reinforced aluminium laminate;
      stringers and ribs in the safety zone, the stringers provided in a longitudinal direction of the aircraft or space vehicle for longitudinal stiffening and the ribs provided in a transverse direction of the aircraft or space vehicle for transverse stiffening, all of the stringers and the ribs consisting of high static strength glass-fibre reinforced aluminum laminate, wherein the stringers are fastened to the skin panels and the ribs are fastened to the skin panels by clips consisting of high static strength glass-fibre reinforced laminate; and
      connecting elements in the safety zone connecting the sheet ends of the skin panels with each other and connecting the stringers and the ribs to the skin panels, the connecting elements in the safety zone formed from at least one of titanium and a titanium alloy.

2. The aircraft or space vehicle according to claim 1, wherein the fuselage section forming the safety zone extends at least throughout a cabin region of the fuselage.

3. The aircraft or space vehicle according to claim 1, wherein the connecting elements are designed as at least one of rivets, screws and bolts.

4. The aircraft or space vehicle according to claim 1, wherein the fuselage or at least a section of the fuselage is provided on an inside with at least one of a thermal and acoustic insulation.

5. The aircraft or space vehicle according to claim 1, wherein all or some of thrust vanes of at least the fuselage section forming the safety zone consist of glass-fibre reinforced aluminium laminate.

6. The aircraft or space vehicle according to claim 1, wherein the aircraft or space vehicle is a passenger or commercial aircraft.

7. The aircraft or space vehicle according to claim 1, wherein the fuselage section forming the safety zone is in a wing region.

8. The aircraft or space vehicle according to claim 1, wherein the connecting elements are titanium bolts.

9. The aircraft or space vehicle according to claim 1, wherein the fuselage section forming a safety zone is provided at least in one of a front cabin region of the fuselage, a rear cabin region of the fuselage, and a central cabin region.

10. The aircraft or space vehicle according to claim 9, wherein the fuselage section forming the safety zone is provided in a cabin region behind a cockpit.

11. The aircraft or space vehicle according to claim 9, wherein the fuselage section forming the safety zone is provided in a cabin region in front of a rear pressure bulkhead.

* * * * *